United States Patent [19]

Matsumura et al.

[11] Patent Number: 5,378,776
[45] Date of Patent: Jan. 3, 1995

[54] METHOD FOR PREPARING OPTICAL POLYMER WITH RADIAL TRANSITION IN REFRACTIVE INDEX

[75] Inventors: Yasuo Matsumura; Shogo Miyata, both of Yokohama; Kanji Kusada, Yokosuka; Kaede Terauchi, Kawasaki, all of Japan

[73] Assignee: Nippon Petrochemicals Company, Limited, Tokyo, Japan

[21] Appl. No.: 996,951

[22] Filed: Dec. 24, 1992

[30] Foreign Application Priority Data

Dec. 26, 1991 [JP] Japan .................. 3-357676
Dec. 27, 1991 [JP] Japan .................. 3-360594

[51] Int. Cl.$^6$ ................................ C08F 220/16
[52] U.S. Cl. ........................... 526/64; 526/71; 526/329.2
[58] Field of Search ............. 526/64, 71, 329.2

[56] References Cited

U.S. PATENT DOCUMENTS 3,955,015 5/1976 Ohtsuka et al. .................. 427/163

FOREIGN PATENT DOCUMENTS 445478 4/1936 United Kingdom .
445478 4/1936 United Kingdom .
2102440 2/1983 United Kingdom .

*Primary Examiner*—Joseph L. Schofer
*Assistant Examiner*—Tom Weber
*Attorney, Agent, or Firm*—Scully, Scott, Murphy & Presser

[57] ABSTRACT

A method for preparing a polymer rod for optical transmission media. The process involves copolymerization of monomers having different boiling points by removal of monomer vapor during polymerization. The process results in a transition in refractive index along the radial direction of the polymer rod.

10 Claims, 2 Drawing Sheets

METHOD FOR PREPARING OPTICAL POLYMER WITH RADIAL TRANSITION IN REFRACTIVE INDEX

BACKGROUND OF THE INVENTION

1. Field of the Invention

The present invention relates to a method for preparing by polymerization a polymer rod having a uniform composition in an axial direction thereof. More particularly, it relates to a method for preparing a polymer rod having a uniform composition in an axial direction by slowly feeding a monomer liquid to a vessel through the upper portion thereof, and then allowing polymerization reaction to proceed, while a part of the monomer is continuously volatilized from the surface of the monomer liquid.

Furthermore, the present invention also relates so a method for preparing a polymer rod, for example, a synthetic resin optical transmission medium having a continuously varied refractive index distribution in the cross section of the polymer rod. More specifically, it relates to a method for preparing a polymer rod as a synthetic resin optical transmission medium which has a refractive index distribution continuously varied in its cross section and a uniform distribution of composition in the direction of its length. It can be used as optical lenses and optical fibers. The polymerization reaction is carried out wish utilizing the difference in gel concentrations in the surface of a liquid mixture and the difference in the liability of monomers to volatilize, while a monomer liquid mixture is slowly fed to a vessel from the upper portion thereof.

2. Description of the Prior Art

Optical transmission media such as lenses and optical fibers are classified into two kinds of types, a single mode type and a multimode type in view of the mode of light transmission.

Among the multimode type optical transmission media, the graded index type optical transmission media having a refractive index distribution varying continuously in a fixed direction are widely used as bar lenses having the function of convex lenses, bar lenses having the function of concave lenses, and broad band optical transmission fibers. Among them, the optical transmission media made of transparent synthetic resins are more widely used in recent years, because they have several advantages in view of light weight, economy, easy handling, high impact resistance and flexibility as compared with those made of quartz.

The optical transmission medium made of a synthetic resin is usually used as a bar lens or an optical transmission fiber which comprises a polymer rod obtained by polymerization or by polymerization and then drawing.

Concerning the preparation of a refractive index distribution type optical transmission medium from a synthetic resin by polymerization reaction in a specific reaction vessel, the following methods have heretofore been proposed.

In U.S. Pat. No. 3,955,015, a monomer to form a polymer having a different refractive index is subjected to diffusion transfer into a previously formed specific transparent solid substance in a partially polymerized state having a three-dimensional reticular structure. After that, the whole polymerization reaction is stopped to obtain a rod-like optical transmission medium of a refractive index distribution type.

In this method, however, it is necessary that the transparent solid substance is previously made into the three-dimensional reticular structure by the use of a multi-functional radically polymerizable monomer in order to maintain the configuration of the transparent solid substance. For this reason, it must previously be made separately, which costs much labor. In addition, the obtained polymer having the three-dimensional reticular structure is not good in thermoplasticity and it is not suitable for other post-forming processes such as drawing. In other words, the practical plastic optical transmission fibers should have stiffness and tensile strength as fiber materials in the drawing step in the manufacturing process. However, the optical transmission medium prepared through the above process has the inherently three-dimensional reticular structure, so that it is not suitable for drawing operation.

In Japanese Laid-Open Patent Publication No. 61-130904, much attention is paid to a difference between the monomer reactivity ratios of two kinds of monomers, and by the utilization of this, there is proposed a method for producing an optical transmission medium having a refractive index gradient. However, in the medium obtained by this method, a good refractive index distribution is not always obtained, and cavities are easily formed owing to volume contraction attributed to polymerization. Thus, it is difficult to obtain an entirely uniform and large sized polymer suitable for industrial production. Furthermore, in the case that an acrylic resin transparent polymerization tube is used, the acrylic resin is dissolved in the monomer at a non-polymerizing position such as the position of the polymerization tube which is immersed in the monomer and to which radical generation energy is not applied, or the position of the polymerization tube which comes in contact with a monomer vapor, so that the thickness of the polymerization tube is uneven and the uniform polymer rod cannot be obtained. In an extreme case, the pipe is dissolved, and consequently it is torn to pieces or made full of holes.

In Japanese Laid-Open Patent Publication No. 61-170705, a method for successively feeding a monomer liquid mixture to a long molding tube is described, but even in this method, a good refractive index distribution cannot always be obtained. When a synthetic resin molded tube is used, the resin portion above the surface of the liquid mixture is dissolved by a monomer vapor, so that the wall thickness of the resin tube is reduced, and in an extreme case, the resin tube is dissolved off. Thus, a polymer uniform in the vertical direction cannot be formed.

The phenomena described above occur even when only one kind of monomer is used.

The present inventors have carried out extensive investigations concerning the process to form a copolymer resin from a liquid mixture of different radically polymerizable monomers. That is, when the viscosity of the monomer liquid mixture rises and the liquid turns into a gel with the progress of the polymerization of the monomers, the growing polymer radical is hardly diffused in the gel because the molecular weight of the polymer radical is large. In this case, the termination reaction between two molecules of the growing polymer radicals hardly proceeds, and as a result, a polymerization rate increases.

The above phenomenon is accepted as the so-called gel effect in the radical polymerization. When the radical polymerization is carried out so that the gel effect is produced from any position in a reaction vessel, the polymerization gradually proceeds toward an opposite end portion.

The inventors of the present application have made further investigation concerning a process in which, for example, two kinds of different monomers are bonded to propagating polymer radicals in a gel. That is, when the polymerization is allowed to proceed from a wall portion to a central portion of a cylindrical vessel, a gel having a higher polymer content is formed on the vessel wall portion in the vicinity of the liquid mixture surface, and the polymer content decreases toward the central portion of the liquid mixture surface. In general, there is a tendency that when a polymer solution containing a volatile substance has a high polymer content, the volatile substance is difficult to volatilize from the solution surface. That is, in the vicinity of the vessel wall where the polymer content is high, the amount of the volatilized substance is smaller than in the central portion of the vessel where the polymer content is low. Usually, when monomers are volatilized from the surface of a solution comprising two kinds of polymerizable monomers, the monomer having a lower boiling point volatilizes more largely, irrespective of a concentration ratio of the monomers constituting the solution. Therefore, in the vicinity of the vessel wall where the amount of the volatilized substance per unit time is small, a difference between the amount of the decreased monomer having a lower boiling point and that of the decreased monomer having a higher boiling point is smaller than in the central portion where the amount of the volatilized substance per unit time is large. In consequence, in the case that, of the selected two kinds of monomers, the monomer having a lower boiling point has a lower refractive index, a convex distribution is formed in which the refractive index increases from the wall portion to the central portion of the vessel. On the other hand, in the case that the monomer having the lower boiling point has a higher refractive index, a concave distribution is conversely formed.

Furthermore, for example, in the case that the vessel wall is composed of a monomer-soluble polymer, a gel containing the dissolved vessel wall polymer tends to settle by gravity. However, when the settlement occurs, the obtained polymer rod is liable to have an uneven structure. In order to prevent the settlement, it is necessary that in the lower portion of the gel containing the dissolved vessel wall polymer, polymerization substantially completes and the unreacted monomer is not present or a little present.

Experiments were done by the present inventors. That is, a monomer was slowly fed to a vessel through the upper portion thereof, and adjustment was made so that polymerization may proceed as much as the amount of the fed monomer, whereby the polymerization was allowed to proceed in compliance with a monomer feed rate. As a result, the volume of the unreacted monomer portion was maintained at a constant level to prevent the gel from settling, which permits uniformly growing the polymer in a vertical upward direction. That is, it has been found that when the fresh monomers are always slowly fed only in the vicinity of the liquid surface in the vessel, a refractive index distribution is formed by the utilization of a difference between ratios of the volatilized monomers and a difference between amounts of the volatilized monomers, and as a result, the polymer grows in a vertical upward direction in accordance with a monomer feed rate to obtain the polymer having a refractive index gradient continuously uniformly extending in the vertical upward direction and in a horizontal direction.

In the disclosure in Japanese Laid-Open Patent Publication No. 61-170705, polymerization is allowed to proceed from a lower portion of a long molded pipe without a forced exhaust means. Therefore, the monomer does not volatilize, so that the polymer rod having a good refractive index distribution cannot always be obtained.

BRIEF SUMMARY OF THE INVENTION

The present inventors have invented a method for preparing a synthetic resin optical transmission medium utilizing a novel copolymerization technique on the basis of the above-mentioned knowledge.

It is, therefore, the primary object of the present invention to provide an improved method for preparing a uniform polymer rod which is free from the above disadvantages in the prior art.

Another object of the present invention is to provide a method for preparing a uniform polymer rod which method can be carried out continuously with a high productivity but without difficulty.

A further object of the present invention is to provide a method for preparing a uniform polymer rod which rod has excellent characteristics such as uniform composition in the direction of its length and continuous refractive index distribution in the cross section.

BRIEF DESCRIPTION OF THE DRAWINGS

These and other desirable objects and features of the invention will become more apparent from the following description taken in connection with the accompanying drawings, in which.

DETAILED DESCRIPTION OF THE INVENTION

Figure 1:
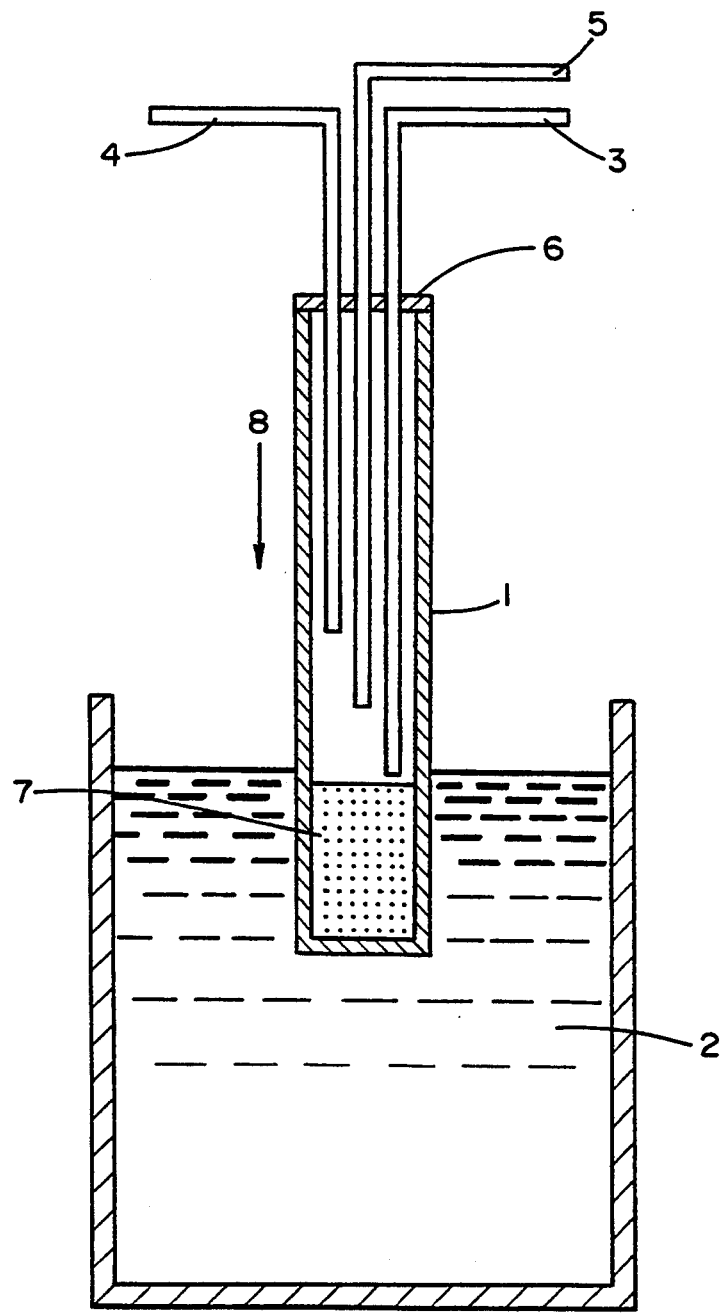
FIG. 1 is a schematic vertical cross-sectional view of a reaction vessel used in Example 1.

In the present invention, it is important that a monomer liquid is slowly fed to a vessel through the upper portion thereof, and the monomer is gradually radically polymerized via a gel condition from an optional position to an opposite end portion in a horizontal direction in the vessel and in a vertical upward direction in accordance with a monomer feed rate, while a part of the monomer is volatilized.

The monomer liquid must be fed to the vessel so that the gel may be formed in the vicinity of the surface of the liquid. No particular restriction is put on the manner of feeding the monomer. The monomer may be fed thereto continuously at a constant rate through the upper portion of the vessel or may be fed little by little at a constant or inconstant interval, but the former way is more preferable. In feeding the monomer liquid mixture, the gel state in the vicinity of the liquid surface must not be destroyed or disturbed. For example, in the case that the feed of the monomer liquid is made by the use of a nozzle, it is preferable that the nozzle is maintained at a predetermined position near to the liquid surface during the polymerization, and the nozzle may come in contact with the liquid surface, so long as it is retained at the position.

The feed rate of the monomer is connected with a polymerization rate and the amount of bubbles formed during the polymerization of the monomer owing to volume decrease attributed to the polymerization. For example, while the monomer is slowly fed to the cylindrical vessel, it is preferred that control is made so that the volume change of a liquid portion containing a large amount of the unreacted monomer may be as small as possible. If the feed rate of the monomer is higher than the polymerization rate, the low-viscosity liquid portion containing a large amount of the unreacted monomer increases together with the monomer feed, and if the wall of the vessel is made of a transparent polymer, a vessel polymer is dissolved to settle a gel, so that an uneven refractive index distribution is liable to be formed. In addition, the unpolymerized portion is present in a long cylindrical form, and unpreferably, bubbles are easily formed owing to volume contraction attributed to the polymerization. Conversely, if the feed rate of the monomer is lower than the polymerization rate, productivity is low, and if it is desired to form the undermentioned refractive index distribution, there decreases the liquid portion in which the monomer is vigorously volatilized and which contains a large amount of the unreacted monomer. In consequence, the effect of the present invention utilizing a volatilization rate difference cannot be exerted. As a result, the polymer having a refractive index gradient continuously extending from an optional position to an opposite end portion in the vessel cannot be obtained.

Therefore, it is necessary to substantially adjust the monomer feet rate to the polymerization rate. That is, the monomer should be fed to the vessel as much as the amount of the monomer which has substantially been consumed for the polymerization. The polymerization rates under various polymerization conditions can beforehand be measured. In the concrete, regulation should be made so that the monomer liquid surface may be always present in a zone of the vessel wall to which energy is locally applied so as to generate radicals necessary for the initiation of the radical polymerization by a suitable known means such as heat or ultraviolet rays. However, so long as the monomer feed rate is substantially turned to the monomer polymerization rate, it is not necessary that the liquid surface level is constantly maintained in the vicinity of the light irradiation zone or the heating zone.

The volatilization of the monomer can be achieved only by volatilizing, from the surface of the liquid mixture, a monomer vapor corresponding to a partial pressure of vapor pressure under polymerization conditions. However, when the monomer liquid mixture is slowly fed to the vessel as in the present invention, the liquid surface exists on the bottom of the vessel particularly at an early stage, and the volatilized monomer (the monomer vapor) tends to reside in the vicinity of the monomer liquid surface. Thus, the spontaneous volatilization of the monomer is practically insufficient.

Accordingly, it is preferable to employ a way for forcedly accelerating the volatilization of the monomer, for example, a process in which an inert gas such as nitrogen or argon not having a bad influence on the radical polymerization is introduced into the vessel and then allowed to stream together with the monomer vapor on the liquid surface to thereby forcedly discharge the monomer, or a process in which the monomer is forcedly volatilized by slightly reducing the pressure on the liquid surface.

FIG. 1 is a schematic vertical cross-sectional view of a reaction vessel for an embodiment of the present invention. Reference Numeral 1 denotes a reactor which is provided with three nozzles at its upper end. Nozzle 3 is a monomer feed nozzle, nozzle 4 is an inert gas feed nozzle, and nozzle 5 is a discharge outlet. The upper end of reactor 1 is hermetically sealed with gas seal 6. When this reactor is employed as described further herein, polymer rod 7 forms and grows within the bottom of reactor 1. As polymer rod 7 grows, reactor 1 is moved downwards in the direction indicated by arrow 8 so that the distances of the lower ends of nozzles 3, 4 and 5 from the upper surface of the polymer rod 7 remain constant. The lower portion of reactor 1 containing polymer rod 7 is located in heating medium 2.

Anyway, so long as the volatilization of the monomer on the liquid surface is not excessively vigorous like a boiling state so as to break or disturb the gel condition of the monomer, any volatilizing manner can be employed. Therefore, taking this requirement into consideration, there should be optionally and practically selected an amount of the inert gas to be introduced in the case of allowing the monomer vapor to stream together with the inert gas, or a vacuum degree in the case of the forced discharge under reduced pressure.

Furthermore, if the amount of the monomer to be volatilized changes with time, the polymer having a uniform composition in a vertical direction cannot be obtained. Hence, it is necessary to constantly maintain the monomer liquid surface in the vicinity of the position to which radical generation energy is applied, and to constantly maintain at least a liquid surface temperature and a polymer concentration gradient of the liquid surface during the polymerization.

In using the monomer volatilization manner in which the monomer vapor is allowed to stream together with the inert gas, it is necessary to constantly maintain a distance between a nozzle of the inert gas and the liquid surface, for example, in the range of 0.1 to 100 cm, and to constantly maintain a flow rate and a discharge amount of the inert gas. The flow rate of the inert gas depends upon the shape and area of the liquid surface, but for example, when a cylinder having an inner diameter of 20 mm is used, the flow rate is from about 10 to 2,000 cc/minute, preferably 50 to 500 cc/minute. When the inner diameter is changed, the flow rate must be also changed proportionally in terms of a volume ratio. The excessively low flow rate leads to the insufficient achievement of a refractive index distribution. Conversely, the excessively high flow rate leads to the occurrence of the turbulence on the liquid surface. For these reasons, both the excessive cases are not preferable.

Also in the case of the monomer volatilization under reduced pressure, it is necessary to constantly maintain a vacuum degree for the same reasons as described above, and the vacuum degree is selected from the range of 10 to 1,000 mm Hg, preferably 100 to 500 mm Hg.

In general, it is preferred that an inert gas introducing inlet (an inert gas feed nozzle) through which the inert gas is introduced into the vessel and a discharge outlet through which the monomer vapor and the inert gas are forcedly discharged are provided retaining a predetermined distance from the monomer liquid surface in the vessel. No particular restriction is put on a discharge means for forcedly discharging the monomer, and an optional means can be employed. Usually, a vacuum pump can be employed as the discharge means.

According to the above-mentioned method of the present invention, a monomer vapor evaporated from the liquid surface can be prevented from substantially coming in contact with the wall of a reaction tube and can also be prevented from condensing in the reaction tube to return the resultant monomer liquid to a liquid surface. Therefore, the present invention can solve problems such as contamination due to the condensation of the vapor on the monomer liquid surface, the dissolution and cleavage of a polymerization tube which is the reaction tube. Thus, the present invention permits obtaining a polymer rod having excellent properties and uniform composition in an axial direction.

When the polymer rod which has not been drawn or has been drawn is used as a bar lens or an optical transmission fiber, it is necessary to form a refractive index distribution in the polymer rod in a direction at a right angle to a polymer rod axis.

In the present invention, two means can be employed in order to form the refractive index distribution in the direction at the right angle to the polymer rod axis. One of the two means is to radically polymerize a liquid mixture of different two kinds of monomers in which a difference between boiling points of these monomers is in specific connection with a difference between refractive indexes of obtained homopolymers, and the other means is to carry out copolymerization via a gel condition from a predetermined position to an opposite end portion in a horizontal direction in the vessel.

When the above-mentioned two means are simultaneously employed, the content of a monomer having a lower boiling point alters in the direction at the right angle to the polymer rod axis in the polymer rod and thus the refractive index distribution is formed.

In the first place, a liquid mixture of different monomers will be described.

The different monomers which are in specific connection with each other are required to be different in measured refractive indexes of homopolymers obtained by separately polymerizing the respective monomers. That is, the monomers should be selected so that a difference between the refractive indexes of the homopolymers formed from these monomers may be at least 0.005. When such monomers are used, one monomer is present in the form of the unreacted monomer in a gel in a higher concentration ratio than in a liquid mixture, and a continuous gradient can be formed in the obtained polymer in a horizontal direction of the vessel, and the synthetic resin optical transmission medium having a refractive index gradient can be obtained. When a mixture of the monomers is used in which the difference between the refractive indexes of the obtained homopolymers is less than 0.005, the obtained polymer cannot possess the important refractive index gradient, even if the polymer has the monomer composition ratio gradient. Incidentally, the maximum value of the difference between the refractive indexes of the homopolymers is generally about 0.5.

Examples of the radically polymerizable monomers which are used in the present invention include monofunctional monomers each having one double bond, i.e., monomers each having one radically polymerizable group such as an allyl group, acrylic group, methacrylic group or vinyl group. A polyfunctional monomer capable forming a reticular polymer with a three-dimensional structure is not included in the monomers of the present invention. However, it is acceptable to use a small amount of the polyfunctional monomer in the scope of the object of the present invention.

Figure 2:
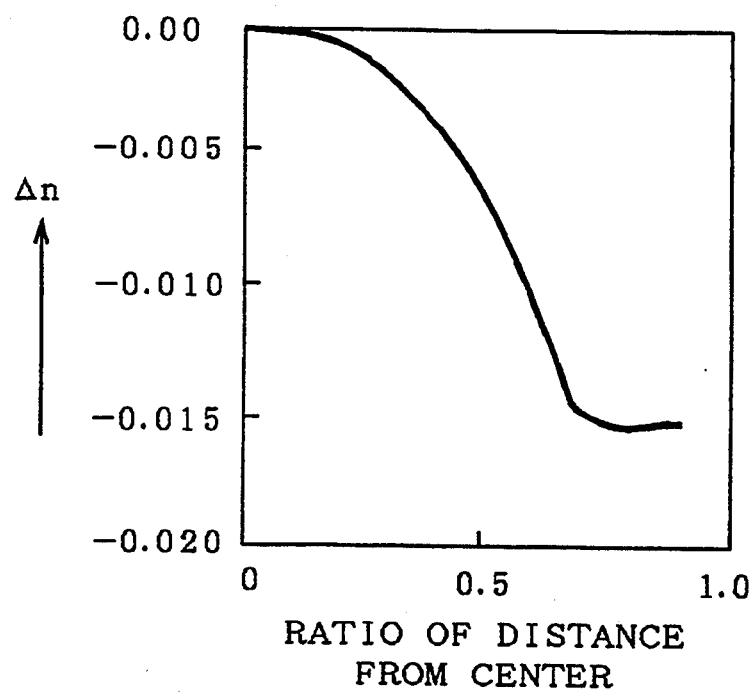
FIG. 2 is a graph showing the distribution of refractive index in the radial direction in the optical fiber obtained in Example 6.

For example, when a cylindrical vessel is used and it is desired to enlarge a refractive index difference between the central portion and the peripheral portion of the obtained polymer rod, the larger a boiling point difference and the refractive index difference between the two kinds of monomers are, the better. It is necessary that the boiling point difference between the two monomers under atmospheric pressure is 25° C. or more. When the boiling point difference is 25° C. or more, the monomers volatilized on the liquid surface in the vessel contain the monomer having a lower boiling point in a higher ratio than the fed monomer liquid, and the amount of the volatilized monomers is larger at the central portion than at the peripheral portion in the vessel. In consequence, the ratio between the monomers at the central portion of the vessel falls off from the ratio between the fed monomers, and the content of the polymer derived from the monomer having a lower boiling point is low at the central portion of the vessel. Therefore, in the case that the monomer having a lower boiling point has a lower refractive index, a convex type distribution is formed in which the refractive index is low at the peripheral portion. FIG. 2 is a graph showing the distribution of refractive index in the radial direction in the cross-section of a polymer rod. The horizontal axis indicates the ratio of distance from the center of the rod and the vertical axis indicates the difference in refractive indexes from the center. Conversely, in the case that the monomer having a lower boiling point has a higher refractive index, a concave type distribution is formed. When the boiling point difference between the two monomers is less than 25° C., the ratio between the volatilized monomers is not sufficiently distant from the ratio between the fed monomers, with the result that there is neither a difference between the amounts of the volatilized monomers nor a difference between the refractive indexes at the central portion and the peripheral portion of the cylindrical vessel. More preferably, the boiling point difference is 50° C. or more, and in this case, a difference between the refractive indexes at the central portion and the peripheral portion is further large, so that the preferable optical transmission medium can be obtained. No particular restriction is put on the upper limit of the boiling point difference, but it is usually 150° C. or lower.

Furthermore, it is defined as desirable conditions in the present invention that a reactivity ratio r of each monomer is 0.2 or higher, preferably 0.5 or higher. The monomer reactivity ratios $r_1$ and $r_2$ denote respectively the ratios $k_{11}/k_{12}$ and $k_{22}/k_{21}$ of coefficients of polymerization rate in the copolymerization reaction of two kinds of monomers ($M_1$ and $M_2$) which are represented by the following equations.

$$M_1 \cdot + M_1 \rightarrow M_1 \cdot \text{ Reaction Rate: } k_{11}[M_1 \cdot][M_1]$$

$$M_1 \cdot + M_2 \rightarrow M_2 \cdot \text{ Reaction Rate: } k_{12}[M_1 \cdot][M_2]$$

$$M_2 \cdot + M_1 \rightarrow M_1 \cdot \text{ Reaction Rate: } k_{21}[M_2 \cdot][M_1]$$

$$M_2 \cdot + M_2 \rightarrow M_2 \cdot \text{ Reaction Rate: } k_{22}[M_2 \cdot][M_2]$$

In the above equations, the symbols $[M_1\cdot]$, $[M_2\cdot]$, $[M_1]$ and $[M_2]$ indicate respectively the concentrations of a polymer propagation radical $M_1\cdot$, a polymer preparation radical $M_2\cdot$, a monomer $M_1$ and a monomer $M_2$.

In the case of two kinds of monomers, the monomer reactivity ratios are two of $r_1$ and $r_2$, as described above, but when three kinds of monomers are used, the ratios increase to six kinds. Also in the case of three kinds of monomers, all of the six reactivity ratios are preferably not less than 0.2, more preferably not less than 0.5.

In the case that the refractive index distribution is formed, no particular restriction is put on the monomers which are used in the present invention, so long as they met conditions described in the present invention, and any combination of these monomers can be used, so long as it provides a transparent polymer and can uniformly copolymerize. In a case other than the above-mentioned case, no particular restriction is put on the monomers, so long as they can carry out radical polymerization. Typical examples of the monomers include vinyl chloride, vinyl acetate, styrene, α-methylstyrene, p-chlorostyrene, acrylonitrile, methacrylonitrile, vinyl phenylacetate, vinyl benzoate, vinyl fluoride, vinylnaphthalene, vinylidene fluoride, vinylidene chloride, methyl acrylate, methyl methacrylate, ethyl acrylate, ethyl methacrylate, butyl acrylate, butyl methacrylate, cyclohexyl acrylate, cyclohexyl methacrylate, phenyl acrylate, phenyl methacrylate, benzyl acrylate, benzyl methacrylate, naphthyl acrylate, naphthyl methacrylate, adamantyl acrylate, adamantyl methacrylate, perfluoroalkyl acrylate and perfluoroalkyl methacrylate.

Above all, the particularly preferable monomers are styrene, acrylates and methacrylates, for example, methyl acrylate, methyl methacrylate, ethyl acrylate, ethyl methacrylate, butyl acrylate, butyl methacrylate, cyclohexyl acrylate, cyclohexyl methacrylate, benzyl acrylate, benzyl methacrylate, adamantyl acrylate, adamantyl methacrylate, perfluoroalkyl acrylate and perfluoroalkyl methacrylate.

Particularly in the case that the refractive index distribution is formed, examples of the combinations of monomers are exemplified by styrene/methyl methacrylate, methyl methacrylate/benzyl methacrylate, methyl methacrylate/2,2,2-trifluoroethyl methacrylate and methyl methacrylate/1,1,1,3,3,3-hexafluoro-2-propyl methacrylate. Among them, the combination of methyl methacrylate-benzyl methacrylate is particularly preferable in view of being easily available, the transparency of an obtained optical transmission medium, the drawing properties of the obtained polymer.

As described in the undermentioned examples, when a liquid mixture of methyl methacrylate and benzyl methacrylate is polymerized from the wall of a cylindrical vessel, a resin is obtained in which benzyl methacrylate is distributed at a high concentration at the central portion and methyl methacrylate is distributed at a high concentration on the side of the inside wall of the vessel. Thus, a convex type optical transmission medium is obtained in which the refractive index at the central portion is larger than on the inside wall.

For easy explanation, two kinds of monomers have been exemplified, but a mixture of optional kinds of monomers is also acceptable in addition to two kinds of monomers. When a mixture of three kinds of monomers is used, it is necessary that the above-mentioned requirements are met among these monomers.

Furthermore, the monomers can contain optional additives such as a radical polymerization initiator and an antioxidant, so long as they do not impair the transparency of the obtained polymer.

As described above, a means for forming the refractive index distribution in a direction at a right angle to a polymer rod axis comprises carrying out copolymerization via a gel condition from a predetermined position to an opposite end portion in a horizontal direction in a vessel.

In order to polymerize the monomer from the predetermined position of the vessel, an optional technique can be employed. In general, the polymerization is performed from an outer peripheral portion toward a central portion of a monomer liquid. As typical techniques, there are a method in which the vessel made of a material having an affinity for the monomer liquid is used, and a method in which the monomer liquid is irradiated with light (in a certain case, heat is applied to the monomer liquid) from the outside to initiate the polymerization from the outer peripheral portion of the monomer liquid.

Accordingly, a vessel and the initiation of polymerization will be described.

In the present invention, a liquid mixture of a plurality of monomers is slowly fed to a vessel through the upper portion thereof, which vessel may be in any configuration such as column, square or sphere, preferably column, and more preferably cylinder. Radical copolymerization is then caused to proceed from an optional end portion on the inner wall surface of the vessel to the central portion of the vessel under the gel effect and simultaneously in a vertical direction. No particular restriction is put on the size of the vessel, and the vessel having an optional size can be employed. For example, when the cylindrical vessel is used, its inner diameter is suitably in the range of 1 to 70 mm. Furthermore, a cylindrical vessel having a transparent synthetic resin rod along the central axis thereof may also be used.

As materials for constituting the vessel, there can be used quartz, glass and synthetic resins such as an acrylic resin and polystyrene. At an early stage of the polymerization, a gel is fixed on the inner wall of the vessel to sufficiently obtain the gel effect. For this achievement, it is preferred to use the vessel made of a material having a large affinity for the monomers to be polymerized. For example, it is particularly preferred to use the vessel comprising a polymer derived from the same monomer as the monomer capable of easily diffusing in a gel phase, or a monomer having the large affinity for this monomer.

In the polymerization, a solvent can be used, but in this case, it is difficult to give a refractive index gradient owing to the boiling point of the solvent. In addition, after the polymerization, the solvent is required to be removed, and this removal of the solvent gives rise to some disadvantages. In consequence, it is generally advisable that the polymerization is done using the monomers themselves as the solvents without using any other solvent.

In the first place, energy such as heat or ultraviolet rays for producing radicals necessary to initiate the radical polymerization is locally applied, for example, to the wall of the vessel by an appropriate known means so as to produce a high-temperature portion or a portion intensively irradiated with the ultraviolet rays in the monomer liquid mixture in contact with the vessel wall, thereby forming the radicals at a high concentration in such a portion, whereby the polymerization reaction is caused to proceed preferentially. In the concrete, light radiation or heating is applied to the outer surface of the vessel from a suitable light source or heat source.

It is possible in the case of a cylindrical or a spherical vessel having a rotary axis that the vessel is rotated on the axis at 1,000 rpm or less. However, it is not desirable to apply mechanical movement such as rotation or stirring to the vessel to destroy or disturb the gel condition of the monomer.

The wavelength and the temperature of heating for the radical polymerization can be optionally selected in accordance with the kinds of monomers. For example, the heating temperature is in the range of room temperature to 150° C. In any case, a known radical polymerization initiator such as benzoyl peroxide (BPO) or a photopolymerization sensitizer can be used in optional amounts as occasion demands. Both the photopolymerization and the thermal polymerization can be simultaneously used.

The initiators for thermal radical polymerization are exemplified by diacyl peroxides such as BPO, lauroyl peroxide, ketone peroxides, peroxy ketals, dialkyl peroxides, peroxy esters and azobis compounds such as azobisisobutyronitrile and azobisisovaleronitrile. The quantity of use is in the range of 0.1 to 10 wt. % to the monomer.

The polymerization initiators for the reactions using light rays such as ultraviolet rays are exemplified by benzoin methyl ether, benzoin ethyl ether, benzylmethyl ketal, hydroxyphenyl ketone, 1,1-dichloroacetophenone, thioxanthones, and benzophenones together with amines.

Furthermore, it is possible to use, as occasion demands, alkylhalides such as carbon tetrachloride and carbon tetrabromide, and alkyl mercaptans such as butyl mercaptan, lauryl mercaptan, octyl mercaptan, dodecyl mercaptan and octylthioglycolate as molecular weight regulating agents.

As a result of the polymerization, when the polymerization is allowed to proceed in the cylindrical vessel, a transparent resin rod having a refractive index gradient in a radial direction can be obtained. This rod can be used as an optical transmission medium as it stands or by applying proper processing. For example, the obtained rod is drawn at an optional drawing ratio by a known method into fibers to produce optical transmission fibers made of a synthetic resin.

A cylindrical transmission medium having the convex type refractive index distribution, where the central portion is high in a refractive index, is used for a bar lens or an optical fiber for optical communication having the function of a convex lens. A cylindrical transmission medium having a concave type refractive index distribution, where the central portion is low in a refractive index, is used for a bar lens or an optical transmission media having the function of a concave lens.

When the reaction is carried out in a rectangular vessel, a plate lens having the function of the convex lens or the concave lens is produced.

That is, according to the present invention, conventional methods can be remarkably improved, and optical transmission media having a good graded index (GI) type refractive index gradient, for example, optical fibers or optical lenses can be easily obtained.

In addition, these optical transmission media are made of thermoplastic resins, and therefore they can be drawn in a subsequent step to easily obtain fibers having a desired shape.

The first method of the present invention will be described in more detail with reference to examples.

EXAMPLE 1

As shown in FIG. 1, a reactor 1 comprising a glass pipe with a sealed bottom was vertically retained in a heating medium 2, and the reactor 1 was provided with a monomer feed nozzle 3, an inert gas feed nozzle 4 and a discharge outlet 5. The upper end portion of the reactor 1 was hermetically sealed with a gas seal 6. Next, 0.10 wt. % of n-butylmercaptan as a chain transfer agent and 0.50 wt. % of tert-butylperoxy-2-ethyl hexanoate (trademark: Perbutyl O, made by Nippon Oils And Fats Co., Ltd.) as a polymerization initiator were added to a liquid mixture of isopropyl methacrylate and styrene (weight ratio of feeds=20:1), and the liquid mixture was then slowly put in the reactor through the nozzle and the upper portion thereof over 10 hours at a constant flow rate in an inert gas of nitrogen, and at the same time, polymerization was carried out at 70° C. During the polymerization, nozzle tips of the monomer feed nozzle 3, the discharge outlet 5 and the inert gas feed nozzle 4 were retained so as to be always 0.5 cm, 5.0 cm and 10.0 cm distant from the surface of the liquid mixture, respectively. After completion of the monomer feed, thermal polymerization was done at 70° C. for 20 hours in the atmosphere to obtain a polymer rod 7 having a length of 30 cm which was quite free from air bubbles.

After the polymerization, the glass pipe was removed, and the polymer rod 7 was then subjected to a post-treatment at 100° C. under a reduced pressure of 0.2 mm Hg for 20 hours. According to measurement, the content of the remaining monomers in the obtained polymer rod was 0.65 wt. % or less.

The obtained polymer rod was sampled, and analysis was made by the use of IR and NMR, and as a result, it was apparent that the polymer rod had a uniform composition both in an axial direction and in a radial direction.

EXAMPLES 2 AND 3

Each polymer rod was obtained by the same procedure as in Example 1 except that isopropyl methacrylate was replaced with isobutyl methacrylate (Example 2) or n-butyl methacrylate (Example 3) and a feed weight ratio of each methacrylate:styrene was 4:1 in both the examples. According to analytical results, both the polymer rods in these examples were free from air bubbles and had a uniform composition both in an axial direction and in a radial direction.

EXAMPLES 4 AND 5

Methyl methacrylate was put in a horizontally held glass tube and both the ends of the tube were sealed up. Afterward, thermal polymerization was done with rotating the tube at 1,500 rpm according to an ordinary method to obtain a polymer tube having an outer diameter of 20 mm and an inner diameter of 15 mm and comprising polymethyl methacrylate having a molecular weight of 100,000.

The outer glass tube was broken and removed, and one end portion of the obtained polymer tube was then sealed. This polymer tube was used as a reactor like a glass tube in Example 1, and it was provided with a monomer feed nozzle, an inert gas feed nozzle and a discharge outlet. Afterward, polymerization was carried out by the same procedure as in Example 1 except that there were used a methyl methacrylate/glycidyl methacrylate solution (feed weight ratio=4:1) (Example 4) or a methyl methacrylate/2-hydroxyethyl methacrylate solution (feed weight ratio=4:1) (Example 5) containing 0.15 wt. % of n-butylmercaptan as a chain transfer agent and 0.50 wt. % of benzoyl peroxide (BPO) as a polymerization initiator. The portions of the polymer tubes above the liquid surface were not dissolved. After completion of the monomer feed, thermal polymerization was similarly carried out at 70° C. for 20 hours under atmospheric pressure to obtain a column polymer which was quite free from air bubbles. During the polymerization, the flow rate of nitrogen was maintained at 150 ml/min.

After the polymerization, the molded articles were subjected to a post-treatment under reduced pressure as in Example 1, and according to measurement, the contents of the remaining monomers in the obtained polymers in the respective examples were 1.0 wt. % or less.

The polymer in each polymer tube was integral with the polymer tube, and so the polymer tube with the polymer therein was cut to remove the end portions thereof, thereby obtaining a polymer rod. Each polymer rod was cut into 10 columns, and the section of each column was then analyzed from a central portion to a peripheral portion by the use of IR and NMR. As a result, it was apparent that these polymer rods had a uniform composition in an axial direction.

Comparative Example 1

(Monomers were fed simultaneously)

A polymer tube made of polymethyl methacrylate was filled with the total amount of a mixture containing the same initiator, chain transfer agent and monomer solution as in Example 2, and reaction was then initiated at 70° C. After 2 hours, however, air bubbles were vigorously generated, and so the operation was stopped.

Comparative Example 2

(Monomers were not volatilized)

The same procedure as in Example 2 was repeated except that nitrogen was not fed at the time of polymerization. In this case, a polymer tube was gradually dissolved at a position several centimeters above a monomer liquid surface, and it was finally cut. Thus, the operation was stopped.

In the following, the second method of the present invention will be described in detail with reference to examples.

EXAMPLE 6

Methyl methacrylate was put in a horizontally held glass tube and both the ends of the tube were sealed up. Afterward, thermal polymerization was done with rotating the tube at 1,000 rpm according to an ordinary method to obtain a polymer tube having an outer diameter of 20 mm and an inner diameter of 15 mm and comprising polymethyl methacrylate having a molecular weight of 100,000.

After the outer glass tube was broken and removed, one end portion of the obtained polymer tube was sealed as shown in FIG. 1 to form a reactor 1. This reactor 1 was vertically retained in a heating medium 2, and it was provided with a monomer feed nozzle 3, an inert gas feed nozzle 4 and a discharge outlet 5. Next, a methyl methacrylate/benzyl methacrylate solution (feed weight ratio=20:1) containing 0.15 wt. % of n-butylmercaptan as a chain transfer agent and 0.50 wt. % of benzoyl peroxide (BPO) as a polymerization initiator was then slowly put in the reactor through the nozzle and the upper portion thereof over 10 hours at a constant flow rate, and at the same time, polymerization was carried out at 70° C. During the polymerization, nozzle tips of the monomer feed nozzle 3, the discharge outlet 5 and the inert gas feed nozzle 4 were retained so as to be always 0.5 cm, 5.0 cm and 10.0 cm distant from the surface of the liquid mixture, respectively. After completion of the monomer feed, thermal polymerization was done at 70° C. for 20 hours in the atmosphere to obtain a column polymer having a length of 30 cm which was quite free from air bubbles. In this case, during the polymerization, nitrogen was fed through the inert gas feed nozzle 4 at a flow rate of 150 ml/min.

After the polymerization, the column polymer was maintained at 100° C. under a reduced pressure of 0.2 mm Hg for 20 hours. According to measurement, the content of the remaining monomers in the obtained polymer was 0.65 wt. % or less.

The polymer in the polymer tube was integral with the polymer tube, and so the polymer tube with the polymer therein was cut to remove both the end portions, and then thermally drawn with indirect heating in a cylindrical heating tube set to 250° C., thereby obtaining an optical fiber having a diameter of 1.0 mm.

The refractive index distribution of the obtained optical fiber in a radial direction thereof was measured by a lateral interference method, and as a result, the optical fiber had the distribution shown in FIG. 2 substantially throughout the whole length. In FIG. 2, an ordinate axis denotes a difference (Δn) between the highest refractive index and a refractive index at a certain distance.

The difference of refractive indexes between the homopolymer of methyl methacrylate and that of benzyl methacrylate is about 0.07.

EXAMPLES 7 AND 8

The same procedure as in Example 6 was repeated except that benzyl methacrylate was replaced with styrene (Example 7) or vinyl phenylacetate (Example 8) and a feed weight ratio of methyl methacrylate:styrene or vinyl phenylacetate was 20:1, thereby obtaining optical fibers which had the same convex type refractive index distribution as in FIG. 2 and a uniform composition in each axial direction and which were free from air bubbles.

The difference of refractive indexes between the homopolymer of methyl methacrylate and that of styrene is about 0.1. Meanwhile, the difference of refractive indexes between the homopolymer of methyl methacrylate and that of vinyl phenylacetate is about 0.09.

Comparative Example 3

(Boiling point difference between monomers was 25° C. or less)

An isopropyl methacrylate/styrene solution (feed weight ratio=20:1) containing 0.15 wt. % of n-butylmercaptan as a chain transfer agent and 0.50 wt. % of benzoyl peroxide (BPO) as a polymerization initiator was slowly put in a vertically held glass tube having one sealed end portion through a nozzle and the upper portion thereof over 10 hours at a constant flow rate while nitrogen was blown thereinto, and at the same time, polymerization was carried out at 70° C. During the polymerization, the tip of the nozzle was retained at the same level as the surface of the liquid. After completion of the monomer feed, thermal polymerization was done at 70° C. for 20 hours in the atmosphere to obtain a column polymer 7 having a length of 30 cm which was quite free from air bubbles.

After the polymerization, the glass tube was removed, and the column polymer was maintained at 100° C. under a reduced pressure of 0.2 mm Hg for 20 hours. According to measurement, the content of the remaining monomers in the obtained polymer was 0.65 wt. % or less.

Next, the polymer was cut to remove both the end portions thereof, and then thermally drawn with indirect heating in a cylindrical heating tube set to 230° C., thereby obtaining an optical fiber having a diameter of 0.6 mm.

The refractive index distribution of the obtained optical fiber in a radial direction thereof was measured by a lateral interference method, and as a result, it was apparent that a difference between refractive indexes at the central portion and the peripheral portion of the optical fiber was scarcely present.

As understood from the above description, according to the present invention, a monomer vapor evaporated from the surface of a monomer liquid can be prevented from substantially coming into contact with the wall of a reaction tube, and the monomer vapor can also be substantially prevented from condensing in the reaction tube to return the resultant monomer liquid to the original liquid. Therefore, the present invention can solve problems such as contamination due to the condensation of the vapor on the monomer liquid surface, and the dissolution and cleavage of a polymerization tube as the reaction tube. Thus, the present invention permits obtaining a polymer rod having excellent properties and a uniform composition in an axial direction.

According to the second method of the present invention, conventional methods can be remarkably improved, and optical transmission media having a good graded index (GI) type refractive index gradient, for example, optical fibers or optical lenses can be easily obtained.

In addition, these optical transmission media are made of thermoplastic resins, and therefore they can be drawn in a subsequent step to easily obtain fibers having a desired shape.

What is claimed is:

1. A method for preparing a polymer rod having a uniform distribution of composition in an axial direction which comprises the steps of slowly feeding a liquid of radically polymerizable monomers to a vertical cylindrical reactor through the upper portion thereof; radically polymerizing the monomers in an upward direction in the reactor, while a monomer feed rate is substantially adjusted to a monomer polymerization rate; and forcedly discharging a monomer vapor from the reactor during the radical polymerization.

2. The method according to claim 1 wherein said radical polymerization is thermal polymerization.

3. The method according to claim 1 wherein the wall of said reactor is made of a transparent polymer, and said radically polymerizable monomers dissolve said transparent polymer.

4. A method for preparing a polymer rod having a uniform composition in a vertical direction and a continuous refractive index gradient in a horizontal direction which comprises the steps of slowly feeding a liquid mixture of a plurality of radically copolymerizable monomers having a boiling point difference of 25° C. or more under atmospheric pressure and a refractive index difference of 0.005 or more between homopolymers formed from these monomers, to a vessel through the upper portion thereof; radically copolymerizing said monomers from a predetermined position to an opposite end portion in a horizontal direction in said vessel and in an upward direction via a gel condition; and during the radical polymerization, volatilizing a part of said monomers from the surface of said monomer liquid mixture, whereby the ratio of the monomer having a lower boiling point in a monomer composition distribution of the obtained polymer continuously decreases from said predetermined position to said opposite end portion in the horizontal direction.

5. The method according to claim 4 wherein the volatilization of said monomers is accelerated by reducing the pressure in said vessel or introducing an inert gas into said vessel and then removing the evaporated monomers together with said inert gas.

6. The method according to claim 4 wherein said vessel is made of a transparent polymer.

7. The method according to claim 4 wherein the polymerization reaction is allowed to proceed from the inner wall surface to the central portion of said vessel and in a vertical and upward direction with the feed of said monomers.

8. The method according to claim 4 wherein said liquid mixture of said radically copolymerizable monomers contains at least one of methyl methacrylate and benzyl methacrylate.

9. The method according to claim 4 wherein the level of said monomer liquid surface is maintained in the vicinity of a position to which energy for radical generation is applied, and tips of a monomer feed nozzle, an inert gas nozzle and a discharge outlet are maintained at a constant interval to the level of said monomer liquid surface.

10. The method according to claim 4 wherein said polymer rod is a synthetic resin optical transmission medium.

* * * * *